United States Patent
Scarnato et al.

[15] 3,672,138
[45] June 27, 1972

[54] FORAGE HARVESTER

[72] Inventors: Thomas J. Scarnato, Barrington, Ill.; Guy O. Tufts, Phoenix, Ariz.; Peter J. Peacock, Western Springs; George B. Cicci, Broadview, both of Ill.

[73] Assignee: International Harvester Company, Chicago, Ill.

[22] Filed: Oct. 16, 1970

[21] Appl. No.: 81,359

[52] U.S. Cl. .................................. 56/158, 56/DIG. 1
[51] Int. Cl. ........................................... A01d 43/02
[58] Field of Search ............ 56/158, 167, 1, DIG. 1, 14.3, 56/14.6, 119, 328 R

[56] References Cited

UNITED STATES PATENTS

| | | | |
|---|---|---|---|
| 2,472,762 | 6/1949 | Sage | 56/14.4 X |
| 2,769,294 | 11/1956 | Goodlad | 56/14.6 |
| 3,375,643 | 4/1968 | McCarty et al. | 56/DIG. 1 |

Primary Examiner—Louis G. Mancene
Assistant Examiner—J. N. Eskovitz
Attorney—Floyd B. Harman

[57] ABSTRACT

A forage harvester having an upwardly and rearwardly inclined platform and a reel sweeping over the platform to move the crops from a cutter at the front edge of the platform to associated mechanism at the rear of the platform. The platform is provided with a plurality of apertures in the form of louvers or corrugations or apertured riffles which are arranged to prevent crops from falling through or plugging the apertures while permitting sand and dirt to sift through the platform.

13 Claims, 11 Drawing Figures

3,672,138
PATENTED JUN 27 1972
SHEET 1 OF 2
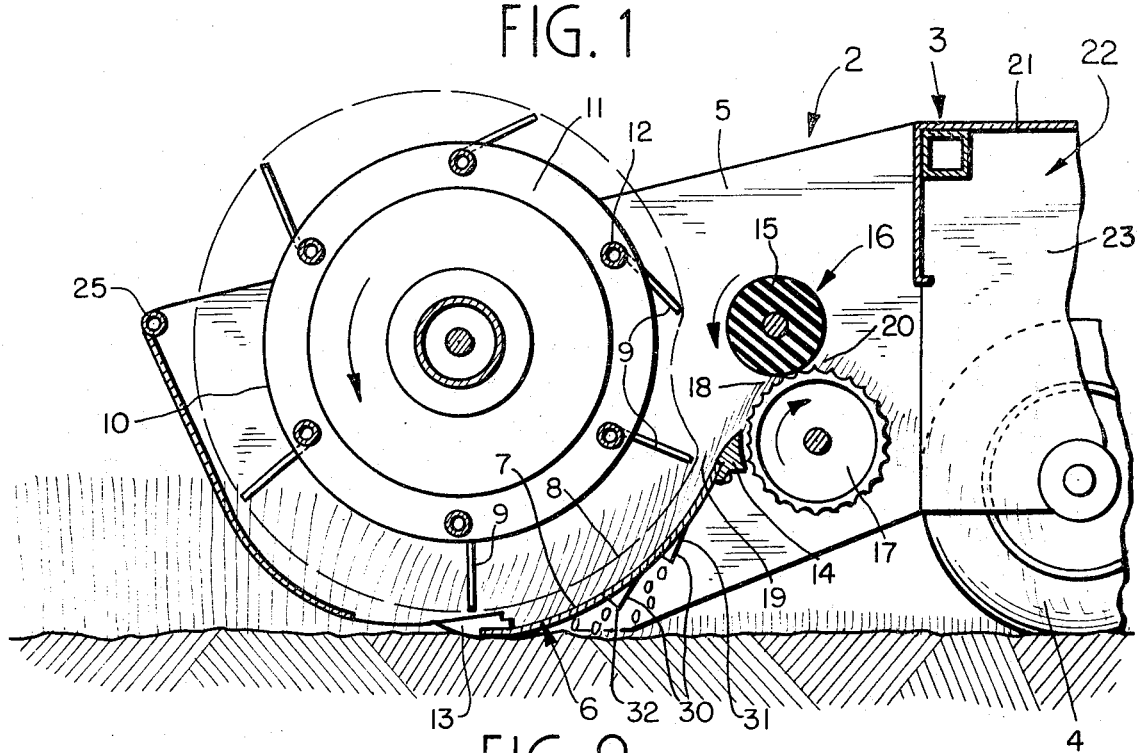
FIG. 1
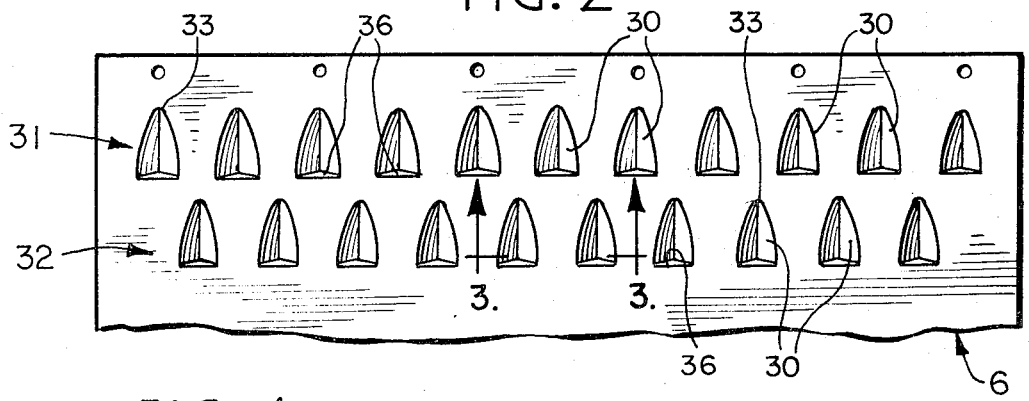
FIG. 2
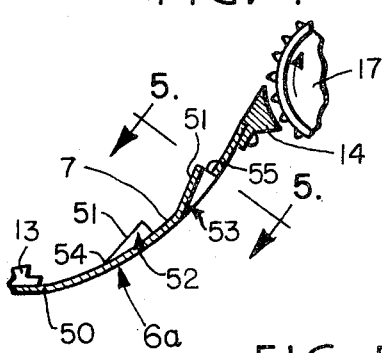
FIG. 4
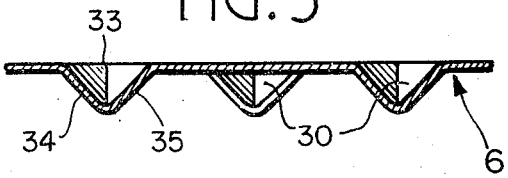
FIG. 5
FIG. 3
Inventors
THOMAS J. SCARNATO
GUY O. TUFTS
PETER J. PEACOCK
GEORGE B. CICCI
John J. Towaich
Attorney

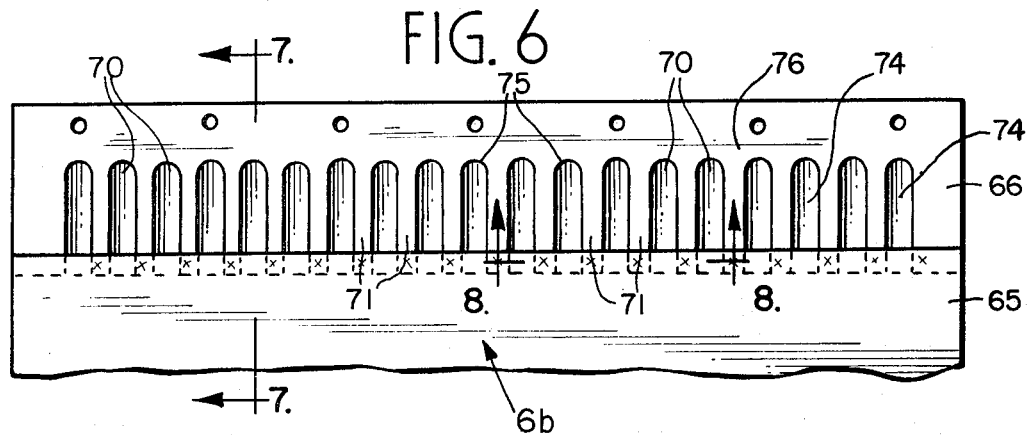
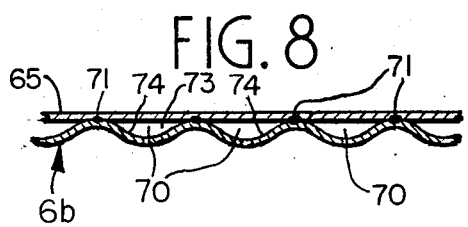
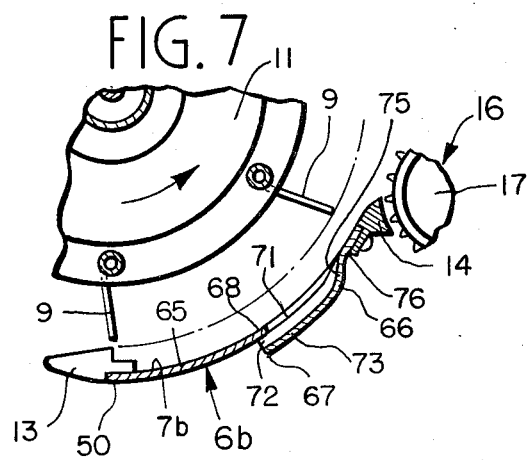
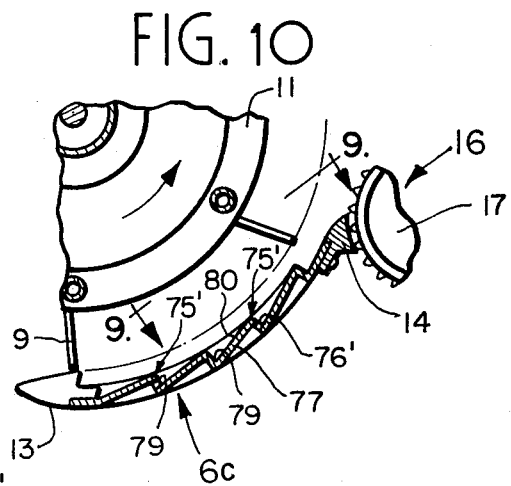
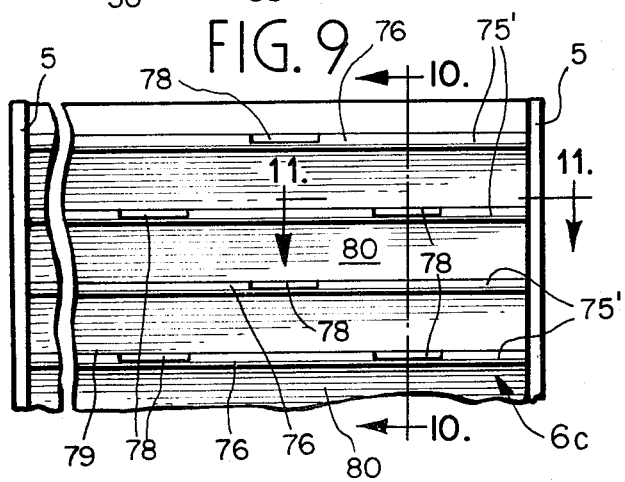
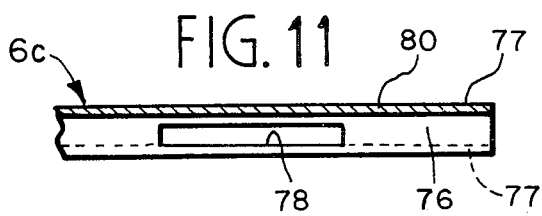

FORAGE HARVESTER

DISCUSSION OF THE ART

One of the serious problems in harvesting forage crops, particularly in sandy and dry country or where gopher mounds exist, is in the contamination of the crops with sand and dirt. In fact, various farm practices are now being considered such as minimum handling and raking of crops to reduce contamination. Excessive contamination reduces the crop grade. Cattle are vulnerable to such contaminants and often grind down their teeth so that they cannot feed. In mower conditioners presently in use, such dirt is accumulated on the platforms and mixes with the crops.

SUMMARY OF THE INVENTION

This invention is directed to a novel device for removing such contaminants at the time the crop is spread thin across the platform and raked through by the reel tines.

A general object is to provide a novel harvester platform which has dirt removing apertures therethrough open upwardly and rearwardly so as to allow dirt to fall out of the hay which is being raked over the platform by the reel tines.

A more specific object of the invention is to provide a platform with overlapping portions which provide a continuous crop supporting structure with apertures having upper dirt receiving ends and lower dirt exit ends whereby the dirt is dropped out of the crops gravitationally and removed from the crops by the vibrations set up in the machine during field traverse.

These and other objects and advantages inherent in and encompassed by the invention will become more readily apparent from the specification and the drawings, wherein:

FIG. 1 is a cross-sectional view of a harvester incorporating one form of my novel platform;

FIG. 2 is a fragmentary plan view of the platform shown in FIG. 1;

FIG. 3 is an enlarged section taken substantially on line 3—3 of FIG. 2;

FIG. 4 is a cross-sectional view of a platform incorporating another form of the invention;

FIG. 5 is an enlarged fragmentary section taken substantially on line 5—5 of FIG. 4;

FIG. 6 is a fragmentary plan view of another form of platform;

FIG. 7 is a cross-sectional view taken substantially on line 7—7 of FIG. 6 view of the platform shown in FIG. 6;

FIG. 8 is a fragmentary enlarged sectional view taken substantially on line 8—8 of FIG. 6;

FIG. 9 is a sectional view taken substantially on line 9—9 of FIG. 10 of another form of the invention;

FIG. 10 is a sectional view taken substantially on line 10—10 of FIG. 9; and

FIG. 11 is a sectional view taken generally on line 11—11 of FIG. 9.

DESCRIPTION OF FIGS. 1 THROUGH 3

The invention is shown in connection with a mower conditioner generally designated 2 of the general type and class more clearly described in the Thomas J. Scarnato et al. application Ser. No. 9020 filed Feb. 5, 1970 for PUSHOVER BAR and comprises a frame structure generally designated 3 carried at its rear end on wheels 4 and comprising a vertical side panel 5 at each side between which is interconnected a platform generally designated 6. The platform preferably has a curved top surface 7 to accommodate the sweep 8 of the tines 9, 9 which are cammed so that they extend on the forward side 10 of the reel 11 on which the fingers are carried by the tine bars 12. The fingers sweep in an arcuate path over the mower bar 13 at the forward lower edge of the platform 6 and then upwardly along the platform and at the rear end portion 14 of the platform being cammed downwardly to withdraw from the crop material and then swing upwardly past the upper roll 15 of the hay conditioning mechanism generally designated 16.

The hay conditioning mechanism includes the roll 15 and a lower roll 17. These are journaled on parallel transverse axes and develop a bight 18 therebetween for receiving the crop material 19 which is being conveyed up the platform by the reel fingers 9. The rollers 15, 17 have a discharge area 20 on the backside directing the material upwardly and rearwardly against the underside of a top shield 21 of a conventional windrowing assembly generally designated 22 and well known to those skilled in the art which includes a side shield 23 at each side operative to position the crops in converging relationship rearwardly under the top plate 21 as well known to those skilled in the art.

The reel on its forward side 10 extends forwardly of the mower bar 13 behind a prostrating bar 25 which is extended between the side panels 5 and adapted to bend tall crop downwardly and forwardly so as not to tangle within the reel.

The platform shown in FIGS. 1, 2 and 3 comprises a panel or plate which has a plurality of pockets 30, 30 depressed downwardly from the top surface 7 of the platform or plate. The rear row 31 of the pockets 30 is offset with respect to the front row 32 of the pockets 30.

Each pocket is of generally triangular configuration having a rearwardly directed apex 33 and downwardly converging side webs 34 and 35 which diverge forwardly and guide any sand or dirt and the like through an aperture 36 which has an exit below the platform and which opens in upward and rearward direction. Thus, any material which is being carried by the reel will flow smoothly over the pockets and inasmuch as the apertures are below the platform the material will not have a tendency to lodge or penetrate the dirt sifting apertures and, furthermore, the contour of the pocket is such as will be conductive to facilitate the movement of the material upwardly and rearwardly.

The staggered relationship of the rear row of pockets with respect to the front row of pockets is adapted to provide coverage from end to end of the platform. Furthermore, it will be observed that the pockets are positioned intermediate the forward and rear ends of the platform in an area where the sweeping sector of the reel tines is aggressive to move the material rearwardly into the conditioning rollers.

DESCRIPTION OF THE EMBODIMENTS SHOWN IN FIGS. 4 AND 5

In this embodiment the parts which are identical with those previously described in conjunction with the embodiment of FIGS. 1 to 3 are shown or identified by the same reference numerals. It will be seen that the platform 6a is associated with the roller 17 at its rear portion of the platform 14 in identically the same manner as the platform 6 of the previous embodiment and that the forward end 50 of this platform connects to the mowers 13 as in the previous embodiment. In this embodiment a plurality of rows of louvers 51, 51 are formed in front and rear rows 52 and 53. Each louver is an upwardly convex structure and tapers downwardly and forwardly to an apical point 54 and is of arcuate configuration presenting an unobstructed upper surface which slips upwardly and rearwardly at a greater angle than the top surface 7 of the platform 6a. Thus, the dirt sifting apertures 55 are at the upper ends of the louvers and face rearwardly and upwardly and have an exit downwardly and forwardly to an area below the platform.

EMBODIMENT OF FIGS. 6 THROUGH 8

The embodiment of FIGS. 6 through 8 is similar to the previous embodiments and identical parts will be identified with the same reference numerals. It will be seen that the reel 11 has its spring tines 9 sweeping over the mower 13 and the deck 6b for moving the material to the hay conditioning roller assembly 16 off the rear end 14. In this embodiment, the front section 65 of the platform is an imperforate concave plate having an upper continuous surface 7b to an area intermediate the ends of the front and rear edges 50 and 14 of the platform. The rear portion 66 of the platform is transversely corrugated and at its forward end 67 underlaps the rear end 68 of the front portion 65. Thus, the corrugations provide a series of troughs 70, 70 which extend parallel with the movement of the material and the movement of the fingers 9. The crest portions 71 of the corrugations are weld-connected as at 72 at the forward portion 67 to the underside of the rear portion 68 of the front section of the platform. Thus, exit passages 73 are developed which have an inlet directed upwardly and rearwardly of the platform and exit and open below the section 65 of the platform to sift out the sand and dirt therethrough. It will be realized that the troughs 74 shallow out at their rear ends as at 75 and flow into a flat section 76 which is joined with the member 14 to provide an unobstructed support surface for the crops.

EMBODIMENT OF FIGS. 9 THROUGH 11

In this embodiment parts common or similar to the previous embodiments will be identified with the same reference numerals. It will be seen that the reel 11 has its resilient spring fingers 9 sweeping over the deck 6c to the forward end of which is connected the mower 13 and its rear end 14 discharges into the lower roller 17 of the hay conditioning roller assembly generally designated 16. In the present embodiment, the platform is formed as a series of riffles 75', 75' each riffle comprising a vertical section 76' from the lower edge of which there is upwardly and rearwardly inclined diagonal section 77 which joins with the upper edge of the succeeding vertical segment 76'. Each segment 76' or web is provided with a series of apertures 78, 78 and these apertures may be offset transversely. Thus, the crop is moved over a series of steps by the tine fingers 9. Any dirt that would be mixed with the crop material would sift out to the pockets 79 and then would gravitate downwardly upon the top surfaces 80 of the segments 77 and through the apertures 78. It will be appreciated that the apertures 78 may have any length desired and may extend from end to end and the paneled segments 77 may be connected only to the side plates 5.

Thus, each embodiment discloses a novel deck structure upon which the material is carried after it is cut and any dirt or sand would be sifted out of the material and discharged through the apertures in the platform. The apertures are so arranged in each instance so that their inlets face downstream from the flow of the material thus the tendency for any of the material to hang in the apertures is entirely eliminated. Furthermore, it will be appreciated that the apertures are arranged intermediate the ends of the platform where the velocity of the material carried by the tines is such that they will not lodge and lay in such manner as to cover the apertures. In addition, the platform orientation being upward and rearward together with the normal vibrations engendered because of the reciprocation of the mower bar and the trundling of the machine over the field will jar the loose particles of dirt from the crop material and will cause the dirt particles to gravitate downwardly through the crops and into the sifting apertures.

Having described several embodiments of the invention, other forms will become apparent from the foregoing description and disclosures which are intended to be covered by the appended claims.

What is claimed is:

1. A harvesting machine comprising an elongated inclined platform having a forward edge and having an upper crop supporting surface sloping upwardly and rearwardly therefrom to an upper terminal rear edge, cutting means at said forward edge for severing crops, said platform adapted to be positioned with said forward edge adjacent to the ground for severing the crops close to the ground and incidentally scooping dirt and the like onto the platform surface, means operating above the platform for raking through the aggregate of crops and dirt for conveying the same upwardly and rearwardly thereon, and means providing a plurality of individual perforations in the platform spaced apart transversely of the direction of movement of the machine and having inlets oriented upwardly of the platform for sifting the dirt out of the crops onto the ground attendant to the jiggling of the crops from vibrations of the machine and bouncing over the field and the agitation of the crops pursuant to said means raking therethrough.

2. The invention according to claim 1, wherein said raking means comprises a portion of its sweep in an upward and rearward direction in an area between the front and rear edges of the platform, and said perforations disposed at said portion of the sweep whereby the crops are pitched over said perforations and prevented from sliding down into the same.

3. The invention according to claim 1 wherein said means providing said perforations comprises a plurality of louvers sloping upwardly and rearwardly above the upper surface of said platform.

4. The invention according to claim 1 wherein said means providing perforations comprises at least one riffle having a vertical section with apertures therein.

5. The invention according to claim 1 wherein said means providing said perforations comprises a transversely corrugated rear section providing a plurality of channels elongated generally parallel with the flow of cut crops thereon, and a front section overlaying the forward end of the rear section and providing a dirt discharge region therebeneath and a crop transfer area from the cutting means to the rear section.

6. The invention according to claim 5 and said rear section having a generally flat rear portion and said channels shallowing out to said rear portion.

7. The invention according to claim 1 and said means providing perforations comprising a series of V-shaped depressed sections in the platform having their apices directed forwardly and providing upwardly directed peaks above the crop supporting surface of the platform.

8. An inclined dirt-sifting platform for a harvester movable in a forward direction and over which an aggregate of cut crops, dirt and the like are conveyed from a forward lower edge to an elevated rear edge, the improvement comprising means providing a series of individual passage means open toward said rear edge and having an exit beneath the platform whereby crops being conveyed on the platform are moved away from the passage means and dirt and the like are caused to gravitate beneath the crops and exit through the passage means, said passage means spaced apart transversely of the direction of travel of the harvester.

9. The invention according to claim 8 wherein said platform has a relatively smooth upper faced front section and a transversely corrugated rear section and said front section has a rear edge terminating in an area intermediate the front and rear edges of the platform and said rear section has a front edge portion underposed with respect to said rear edge of the front section.

10. The invention according to claim 8 and said platform having intermediate its front and rear edges a series of louvers raised from the plane of the platform and providing upwardly and rearwardly sloping upper areas.

11. The invention according to claim 8 and said platform having at least one riffle comprising a generally vertical web segment, a diagonal segment extending upwardly and rearwardly from the lower edge of the web segment and said passage means located in said vertical web segment.

12. The invention according to claim 8 and said platform having a series of depressed segments shallowing out toward the rear edge of the platform and having forward edges defining the lower and side margin of the passage means.

13. The invention according to claim 8 and said platform having front and rear sections imbricately arranged and defining said passage means between adjacent portions thereof.

* * * * *